United States Patent Office 2,768,140
Patented Oct. 23, 1956

2,768,140

OIL-SOLUBLE SODIUM HYDROCARBYL PHENATES AS COLOR STABILIZERS FOR MINERAL LUBRICATING OILS

Abel Johannes Cornelis Bart and Bartholomeus Cornelis Maas, Julianadorp, Curacao, Netherlands West Indies, assignors to Shell Development Company, Emeryville, Calif., a corporation of Delaware No Drawing. Application February 26, 1954, Serial No. 412,935

Claims priority, application Netherlands March 5, 1953

4 Claims. (Cl. 252—42.7)

This invention relates to improved mineral oil compositions, and more particularly pertains to mineral lubricating oils which during storage are resistant to color and oxidation deterioration.

Color stable mineral lubricating oils, in addition to having customer appeal or acceptance, are also a valuable aid in serving as an index with respect to the oxidation stability of oils in storage or in use.

The color of a mineral lubricating oil is due to the presence of asphaltenes, resins and complex hydrocarbons which are present therein. These materials under oxidizing conditions tend to deteriorate causing the oil to discolor and produce other undesirable effects.

Although various refining and additive inhibition means have been employed to color stabilize mineral lubricating oils, in general the results obtained are undesirable. Thus, too drastic a refining treatment is costly and in addition certain natural inhibitors are removed in such a treatment rendering the oil less resistant toward oxidation and color deterioration. Additives such as caustic soda used to color stabilize oils during refining cause an emulsion and filtration problem. Although there is a relatively large class of compounds, e. g., amines and alkyl phenols, which are good antioxidants, these compounds have little effect on color stabilization, or, if suitable for such a purpose, must be used in rather large amounts of at least 0.5% or higher.

It is an object of this invention to produce a color stable mineral oil. It is another object of this invention to produce an oxidation-stable, color-resistant mineral lubricating oil under storage and use conditions. Other objects will become apparent from the description of this invention.

It has now been discovered that an oxidation and color stable mineral oil such as a mineral lubricating oil can be produced by addition thereto of a very minor and critical amount not in excess of about 0.05% and in general between 0.001% and 0.01% based on the mineral oil of a sodium salt of a mono or polyhydric phenol containing at least one hydrocarbyl radical of at least 8 or more carbon atoms or mixtures of such hydrocarbyl radicals and hydrocarbyl radicals of less than 8 carbon atoms, said hydrocarbyl radicals being attached to the aromatic nucleus. These hydrocarbyl radicals may be unbranched alkyl radicals such as straight-chain octyl, nonyl, cetyl, dodecyl, octadecyl radicals, or branched chain alkyl radicals, such as 2-ethylhexyl and 3,5,5-trimethylhexyl radicals; aralkyl radicals which include octylbenzyl and phenylbenzyl radicals, alkaryl radicals such as octylphenyl, didodecylphenyl and nonylnaphthyl radicals; and alicyclic radicals such as 3,5,5-trimethylcyclohexyl, 2 - ethylhexylcyclohexyl, and dodecyclcyclohexyl radicals and mixtures thereof. Hydrocarbyl radicals of less than 8 carbon atoms which may be present in conjunction with at least one C8 or higher hydrocarbyl radicals as described above and can be illustrated by methyl, n-propyl, n-butyl, isopropyl, tertiarybutyl radicals and the like.

The aromatic nucleus should be devoid of other substituent groups particularly polar groups other than the hydrocarbyl radicals mentioned above.

Specifically, the sodium hydrocarbyl substituted phenates for use in compositions of this invention can be simple phenates such as sodium dodecyl phenate, sodium didodecyl phenate or polyphenates where a plurality of the simple sodium phenates are condensed at positions ortho and/or para to the phenolic hydroxy group through alkylidene (methylene) radicals or other suitable divalent non-metallic radicals of the sulfur family. The sodium phenates and mixtures thereof can be prepared and added to the base oil by any suitable means. Thus, the sodium phenate can be prepared and added to the oil neat or as a concentrate, or the sodium phenate can be prepared in situ in a base oil.

Sodium phenates may be dissolved as such in lubricating oils. It is also possible to dissolve the free phenol in mineral oil and convert the phenol in situ into the sodium compound. To this end sodium hydroxide may be added, preferably in the solid state, to the mineral oil in which the phenol has been dissolved. The sodium hydroxide is preferably used in a slight excess. In order to promote the conversion of the free phenol into the sodium compound and to remove the water formed thereby, it is preferable to add also a low-boiling hydrocarbon, for example, benzene to the mineral oil. Suitable for use is a quantity of 0.5–2 parts by volume of benzene or other low-boiling hydrocarbon oil and water, entrained in the form of an azeotropic mixture, removed. In addition to the benzene already referred to examples of suitable low-boiling hydrocarbons are: toluene, xylene, and gasolene hydrocarbons with a boiling point of from 60° C. to 80° C. Hydrocarbons which form an azeotropic mixture with water and have a boiling point below 150° C. are generally suitable.

After completion of the distillation to remove the water formed during conversion of the free phenol into the sodium compound, the excess of sodium hydroxide which deposits in the form of a solid mass, may easily be removed by filtering or centrifuging. It is also possible to decant the mineral oil from the solid sodium hydroxide.

A concentrate of sodium phenate (sodium dodecyl phenate) in a mineral oil may be prepared in the manner indicated. The concentrate may be added to the same or another mineral oil than the one employed for the preparation of the concentrate, in order to obtain a mineral oil with the desired sodium phenate content.

EXAMPLE I

Phenol was alkylated with a tetramer of propene in the ratio of 2 mol of this tetramer to 1 mol phenol. The tetramer had a boiling range of 180° C. to 236° C., a bromine number of 97 (determined according to the Lewis and Bradstreet Method, cf. Industrial and Engineering Chemistry, Analytical Edition, 12, No. 7 (July 15, 1940, pp. 387–390)), and an average molecular weight of 157. The alkylation of the phenol was carried out by reacting the mixture at a temperature below 30° C. under influence of 98% sulfuric acid as alkylation catalyst. During reaction the mixture was stirred, the alkylation catalyst being slowly added. In total a quantity of 0.2 mol $H_2SO_4$ per mol phenol was added. Stirring of the reaction mixture was continued for 12 hours.

After a settling time of 6 hours, the acid catalyst layer was drained and the reaction mixture neutralized with sodium hydroxide in a quantity of about 0.1 mol NaOH per mol of the original phenol.

The neutralized mixture was then distilled, at first under atmospheric pressure and then, after the temperature had increased to 260° C., under reduced pressure. During this distillation the fraction with a boiling range of 175° C. to 250° C. at a pressure of 10 mm. Hg was collected separately. This fraction having an average molecular weight of 266 was the alkylated phenol, mainly consisting of dodecyl phenol which was further converted into the corresponding sodium phenate. For the sake of convenience the expressions "dodecyl phenol" and "sodium dodecyl phenates" will sometimes be used hereinbelow to refer to the entire fraction and the sodium compound formed therefrom respectively. This alkylated phenol fraction was obtained in a yield of 68% of the theoretical quantity calculated on the quantity of phenol used as starting material.

From the said alkylated phenol fraction, mainly consisting of dodecyl phenol, a 7% solution was prepared in a medium-heavy lubricating oil obtained by treatment with $SO_2$ of a lubricating oil distillate produced from a naphthenic crude oil. The lubricating oil had the following properties:

| | |
|---|---|
| Viscosity | $E_{50}$=9.5. |
| Viscosity index | 44. |
| Specific gravity | 0.906. |
| Flash point ("closed cup") | 221° C. |
| Flash point ("open cup") | 229° C. |
| Pour point | −26° C. |
| Color (Union) | 1½+. |

To the solution of dodecyl phenol in the described lubricating oil, solid sodium hydroxide was added in an excess of 20%, after which an equal volume of benzene was added to the solution.

Benzene and an azeotropic mixture of benzene and water was then distilled from the solution until a vapor temperature of 225° C. was reached.

Finally, the excess of sodium hydroxide which had settled was removed from the distillation residue after cooling; thus a concentrate of sodium dodecyl phenate in lubricating oil was obtained. The solution finally obtained contained 5.1% by weight of sodium dodecyl phenate.

This concentrate was added to the same lubricating oil used for preparing the concentrate in such quantities that samples were obtained with a quantity of sodium dodecyl phenate of 0.0036% by weight and 0.0071% by weight respectively.

The oxidation stability of the lubricating oil samples was determined by means of the so-called B. A. M. test (cf. World Petroleum Congress 1933, Proceedings, volume II, pp. 448–457). For purposes of comparison this B. A. M. test was also applied to the lubricating oil without the addition of sodium dodecyl phenate. When carrying out the B. A. M. test the ratio of the viscosity of the lubricating oil, after the oxidation effected during this test (blowing air at the rate of 15 liters per hour at a temperature of 200° C. during two periods of 6 hours with an interval of 18 hours during which no air was passed through), to the viscosity of the oil before the test was determined, and also the increase of the so-called Ramsbottom-coke number caused during the test.

The results obtained during the B. A. M. test are given in the following table:

*Table I*

| Added quantity of sodium dodecyl phenate | Viscosity ratio | Increase Ramsbottom-coke number |
|---|---|---|
| None | 2.06 | 1.25 |
| 0.0036% by weight | 1.58 | 0.52 |
| 0.0071% by weight | 1.54 | 0.35 |

The data in this table show that the stability of the oil to oxidation was greatly improved by adding the slight quantities of 0.0036% by weight or 0.0071% by weight of sodium dodecyl phenate.

On the other hand, no appreciable improvement in the oxidation stability could be obtained by adding to the lubricating oil the equivalent quantity of potassium dodecyl phenate.

EXAMPLE II

The concentrate of sodium dodecyl phenate described in Example I was added to a lubricating oil similar to the one of Example I in such a quantity that the lubricating oil contained 0.0021% by weight of sodium dodecyl phenate. The B. A. M. test was again applied to this lubricating oil, whereby for purposes of comparison, a test was also made with a lubricating oil to which no sodium dodecyl phenate was added.

*Table II*

| B. A. M. Test | Lubricating oil without additive | Lubricating oil + 0.0021% by weight of sodium dodecyl phenate |
|---|---|---|
| Viscosity of the oil at 37° C.: | | |
| Before oxidation c. s. | 145 | 145 |
| After oxidation c. s. | 215 | 195 |
| Viscosity ratio | 1.48 | 1.34 |
| Ramsbottom-coke number in percent in weight: | | |
| Before oxidation | 0.14 | 0.14 |
| After oxidation | 0.82 | 0.57 |
| Increase | 0.68 | 0.43 |

The color stability of the neat oil and compounded oil was also measured by the ASTM (Union) method and it was observed that the oil containing 0.0021% by weight of sodium dodecyl phenate was more stable to color deterioration than the neat oil.

EXAMPLE III

Another sodium phenate, namely a sodium $C_{14}$–$C_{18}$ alkyl phenate, was prepared by alkylating phenol with a mixture of $C_{14}$–$C_{18}$ alkanes, obtained by cracking solid paraffin hydrocarbon oil and thereafter neutralizing said alkyl phenol with sodium hydroxide in the manner described above. This sodium phenate was added to a lubricating oil similar to the one in Example I in such a quantity that the oil contained 0.0005% or 0.001% by weight of the phenate, calculated as NaOH. The two samples thus obtained and also the lubricating oil without additive were subjected to the B. A. M. test described in Example I as well as to the test described in Example II to determine the color stability. The results obtained are shown in the following Table III:

*Table III*

| Added quantity of sodium alkyl phenate | B. A. M. Test | |
|---|---|---|
| | Viscosity ratio | Increase Ramsbottom coke number |
| None | 1.37 | 0.53 |
| 0.0005% by weight (calculated as NaOH) | 1.27 | 0.33 |
| 0.001% by weight (calculated as NaOH) | 1.22 | 0.22 |

The above oil compositions were subjected to the ASTM (Union) color test and were found to be excellent whereas the neat oil showed up poor in this test.

EXAMPLE IV

To a lubricating oil similar to the one of Example I 0.001% by weight of sodium dodecyl phenate calculated as NaOH, was added. To another sample of the same lubricating oil potassium dodecyl phenate was added in such a quantity that this sample contained per liter the same amount of gram atoms of potassium as the amount of gram atoms of sodium present in one liter of the former mixture.

The two examples were subjected to the B. A. M. test described in Example I, while for purposes of comparison a test was also made with the lubricating oil without additive. The results obtained are shown in the following Table IV:

*Table IV*

| Additive | Viscosity ratio | Increase in Ramsbottom-coke number |
|---|---|---|
| None | 1.64 | 1.05 |
| Sodium dodecyl phenate | 1.33 | 0.44 |
| Potassium dodecyl phenate | 1.49 | 0.73 |

The above compositions were subjected to the ASTM (Union) color test and while the oil containing sodium dodecyl phenate was excellent, the oil containing the potassium dodecyl phenate and the neat oil were poor.

Illustrative examples of other sodium phenates which can be used in compositions of this invention include: sodium cetyl phenate, sodium decyl phenate, sodium octadecyl phenate, sodium didodecyl phenate, sodium dodecyl cresylate, sodium phenylbutyl phenate, sodium oleyl phenate, sodium oleyl cresylate, sodium cetylphenyl phenate, sodium salt of decyl resorcinol, sodium salt of dodecyl catechol, sodium salt of ceryl naphthanol, sodium salt of the condensation product of octylphenol with formaldehyde, and mixtures thereof.

The hydrocarbon oils which can be stabilized by the sodium salt of this invention may be a hydrocarbon oil obtained from any hydrocarbon crude such as paraffinic or naphthenic stocks and/or mixtures thereof. The viscosity of the oil may vary over a wide range such as from 45 SUS at 100° F. to 100 SUS at 210° F. and may have a low or high viscosity index.

Compositions of this invention in addition to being excellent lubricating oil compositions can be employed as switch oils, transformer oils, electrical oils, and the like.

Compositions of this invention can be modified by addition thereto of minor amounts (0.001–2%) of pour point depressants, viscosity index improvers, blooming agents, corrosion inhibitors, oiliness agents and the like. Among such materials can be included high molecular weight polymers, e. g., "Acryloids," was naphthalene condensation products, isobutylene polymer, alkyl styrene polymers, inorganic and organic nitrites such as $NaNO_2$ or $LiNO_2$ and diisopropylammonium nitrite or dicyclohexylammonium nitrite; organic phosphites, phosphates and phosphonates such as trichloroethyl phosphite, tricresyl phosphate, dilorol phosphate, phosphorus sulfide-olefin reaction products such as $P_2S_5$-terpene reaction products, metal organic phosphates, e. g., Ca or Zn dicyclohexylthiophosphate or methylcyclohexylthiophosphate; organic sulfides, e. g. wax disulfide, ethylene bistolyl sulfide; amine, e. g., octadecylamine and the like.

We claim as our invention:

1. A color stable, oxidation resistant mineral lubricating oil composition consisting of a major amount of a mineral lubricating oil having incorporated therein from about 0.0001% to about 0.01% by weight of an oil-soluble sodium alkyl phenate, said alkyl radical having at least 8 carbon atoms.

2. A color stable, oxidation resistant mineral lubricating oil composition consisting of a major amount of a mineral lubricating oil having incorporated therein from about 0.0001% to about 0.01% by weight of an oil-soluble sodium alkyl phenate, said alkyl radical having from 8 to 40 carbon atoms.

3. A color stable, oxidation resistant mineral lubricating oil composition consisting of a major amount of a mineral lubricating oil having incorporated therein from about 0.0001% to about 0.01% by weight of an oil-soluble sodium dodecyl phenate.

4. A color stable, oxidation resistant mineral lubricating oil composition consisting of a major amount of a mineral lubricating oil having incorporated therein from about 0.0001% to about 0.01% by weight of oil-soluble sodium $C_{14}$–$C_{18}$ alkyl phenate.

References Cited in the file of this patent

UNITED STATES PATENTS

| 2,057,212 | Shoemaker et al. | Oct. 13, 1936 |
| 2,125,961 | Shoemaker et al. | Aug. 9, 1938 |
| 2,197,833 | Reiff | Apr. 23, 1940 |
| 2,344,988 | Kavanagh | Mar. 28, 1944 |